United States Patent [19]

Korpela

[11] Patent Number: 5,076,888

[45] Date of Patent: Dec. 31, 1991

[54] PROCESS FOR WETTING A PAPER WEB DURING CALENDERING USING COATING WITH WATER-CONTAINING MICROCAPSULES

[75] Inventor: Markku S. Korpela, Lappeenranta, Finland

[73] Assignee: Kaukas Oy, Lappeenranta, Finland

[21] Appl. No.: 599,141

[22] Filed: Oct. 17, 1990

[30] Foreign Application Priority Data

Oct. 31, 1989 [FI] Finland .................................. 895164

[51] Int. Cl.[5] ............................................ D21H 21/54
[52] U.S. Cl. ..................................... 162/135; 162/198; 162/206; 162/DIG. 6
[58] Field of Search ............... 162/135, 136, 198, 206, 162/DIG. 6; 427/150, 151

[56] References Cited

U.S. PATENT DOCUMENTS

| | | | |
|---|---|---|---|
| 4,020,210 | 4/1977 | Greer | 428/307 |
| 4,370,923 | 2/1983 | Schmidt | 162/253 |
| 4,642,164 | 2/1987 | Hanhikoshi et al. | 162/207 |

Primary Examiner—Richard V. Fisher
Assistant Examiner—Brenda Lamb
Attorney, Agent, or Firm—Scully, Scott, Murphy & Presser

[57] ABSTRACT

The invention relates to a process for wetting a paper web in a calendering step by using water-containing microcapsules in the surface structure layer of the paper web, said microcapsules being ruptured in the calendering step whereby water is released. The invention also relates to microcapsules comprising a water-impermeable shell and an interior substantially comprising water, and having a diameter of 0.1 to 100 μm and a shell thickness of 0.01 to 5 μm.

4 Claims, No Drawings

PROCESS FOR WETTING A PAPER WEB DURING CALENDERING USING COATING WITH WATER-CONTAINING MICROCAPSULES

The invention relates to a process for wetting a paper web in a calendering step, which process is characterized in that water-containing microcapsules are used in the surface structure layer of the paper web, said microcapsules being ruptured in the calendering step whereby water is released.

The invention also relates to microcapsules comprising a water-impermeable shell portion, and a liquid substantially comprising water within said shell portion.

In the manufacture of printing papers, calendering is a very important process step. It is employed for instance in the break stacking of base paper to ensure the uniformity of its quality before further processing, such as blade coating.

The most significant effect of calendering on the final technical properties of printing paper is produced, however, in the last step of the process subsequent to the other processing steps.

In practice, it is aspired to influence e.g. the glaze, smoothness and absorbency characteristics of the paper, yet so that the negative effects of the calendering (for instance increase in density, impairment of opacity) on the final quality remain within the desired bounds.

The surface properties of the paper, such as the microroughness and macroroughness, fiber puffing, porosity etc., are in this case key factors in view of the desired result.

Very important parameters in calendering are the following:
  number of nips
  properties of rolls
  linear pressure
  temperature
  properties of paper
  moisture conditions
  process speed Particularly the moisture conditions in the nip should be taken into account. The desired moisture level is achieved in the existing methods for instance by regulating the moisture content of the paper web on the coating machine prior to calendering so that a certain amount of water remains within the paper structure, or by adding water or steam in connection with the calendering.

One drawback in the calendering of printing papers is normally the increase in the density of the paper. For this reason, one has started studying whether the paper surface properties only can be influenced, and so called gradient calendering has been developed wherein there are temperature as well as moisture gradients in the z-direction of the paper web (higher temperature/moisture level at the surface than within the paper). Application of steam to the surface of the paper web is a known method of regulating the moisture in paper calendering. However, a drawback of steam wetting is the non-uniformity in the distribution of the moistening agent in the transverse direction of the web; moreover, a relatively large proportion of the moistening agent does not come into contact with the web at all but is directed to the environment.

It has now been found that the paper web can be wetted by using water-containing microcapsules in the surface layer thereof. The microcapsules are advantageously added to the coating slip, and they are ruptured in the calendering step and water is released.

The novel process is particularly well suited to novel on-line hot calendering, wherein owing to the process only the surface layer becomes wet and the paper web remains unwetted in the interior thereof.

Also in soft calendering, a considerable quality benefit is achieved with the novel process. Profile regulation in on-machine as well as off-machine applications is also facilitated by the process, since part of the water is encapsulated and will thus not swell the fibers.

U.S. Pat. No. 4 020 210 relates to a copying paper product including water-containing microcapsules. Therein the purpose of the water is to maintain moisture in the paper during electrostatic copying, particularly when copies are made on both sides of the paper.

In accordance with the invention, the desired moisture gradient is achieved by using water-filled microcapsules in the surface structure layer of the paper web, preferably in the coating. These microcapsules are applied to the paper either alone or in combination with other substances in connection with the surface finishing of the paper. Blade coating in the production of LWC paper wherein the microcapsules can be added to the coating slip may be mentioned as an example.

When paper coated with microcapsules reaches the calender, the calender conditions and/or shell material of the microcapsules are regulated so that the capsules are ruptured in the desired manner in the nips, for instance on account of the temperature and/or linear pressure. Thus water is released and moisture increases mainly in the surface coating layer only. Depending on the quantity of microcapsules, the moisture will increase to a certain level; thus a moisture gradient has developed.

Compared with the known steam or water moistening, more uniform distribution of the moisture is achieved specifically in the layer desired, i.e. in the surface layer of the coating, with the novel process.

When microcapsules are used, also the actual calendering process/apparatus becomes simpler since steaming can be eliminated.

The microcapsules of the invention comprise a water-impermeable shell portion and an interior substantially comprising water. The shell portion is so rigid that the capsule will withstand rupture prior to calendering, for instance in connection with the preparation of the slip, in the roll application nip, beneath the blade, etc. Furthermore, the shell portion is steam proof.

The size of the microcapsules may vary, depending on the manner of application, within the range 0.1 to 100 $\mu$m, preferably 0.2 to 2 $\mu$m. The wall thickness of the shell portion is 0.01 to 5 $\mu$m, preferably 0.02 to 0.05 $\mu$m. The interior portion of the capsules may contain, except water, various pigments, binders, hydrated salts, etc.

Manufacturing materials for the shell portion of the water-filled microcapsules are for instance synthetic polymers (polyvinyl acetate, polystyrene, polyamide, polyethylene, etc.), cellulose derivatives, gelatin, starch, resins, paraffins, silicones, etc. The shell material is selected e.g. on the basis of the typical properties of the material (starch is rigid, polyethylene is plastic, polybutadiene is soft, etc.). In addition to these substances, certain emulsifiers, stabilizers, catalysts and other special chemicals are used in the microcapsule production process.

Processes for preparing microcapsules have been disclosed in U.S. Pat. Nos. 4 157 983 and 4 020 210.

The microcapsules used in the new process are advantageously manufactured by the emulsifying method. The preparation of the microcapsules by the emulsifying method can be divided into four main steps:

1) mixing the material to be encapsulated (water), emulsifier, prepolymer (or prepolymer combination) and water-insoluble liquid (hydrocarbon or derivative thereof)

2) emulsifying said admixture until the desired particle sizes (microcapsule sizes) have been reached, 3) adding a catalyst, whereby the prepolymer is hardened and the dispersed water particles remain confined within the shells, 4) separating the microcapsules.

In this invention, the main constituent used for the shell of the microcapsule is a prepolymer or a combination containing, in addition to the prepolymer, other polymers or monomers. These have been pretreated in a water-based solution. The dry solids content of the polymer (+monomer) solution upon adding into the emulsifying vessel together with the other components is 20 to 80%. Suitable shell materials include gelatin, alginate, ethyl cellulose, polymethyl methacrylate, starches, carboxymethyl cellulose, paraffin, glycerol tristearate, polyvinyl alcohol, polyethylene, polypropylene, polystyrene, polyacrylamides, polyethers, polyesters, polyamides, polybutadiene, polyisoprene, silicones, epoxy resins, polyurethanes, gum arabic, vinylidene chloride/acrylonitrile copolymer, vinyl polymers, polycarbonates, polysulfonates, chlorinated raw rubbers, cellulose derivatives and urea-formaldehyde polymer.

The prepolymer may be modified in order to impart to the shell the desired properties, that is, if the prepolymers (e.g. urea-formaldehyde) are modified with other monomers, the following monomers can be used: melamine, thiourea, guanidine, dicyanamide, aromatic amino compounds and other carbamine compounds.

Suitable emulsifiers are those having a low HLB (hydrophile-lipophile balance) value (2 to 8), and a suitable amount of emulsifier is 0.3 to 1.7 parts by weight of emulsifier for 1 part by weight of water-insoluble liquid.

Typical emulsifiers are, for instance, stearic monoethanolamide, polyethylene oxide and polypropylene oxide block copolymers, ethyleneamine derivatives of polyethyleneoxide block copolymer, lanolin derivatives, sorbitol derivatives and sitosterol derivatives. The emulsifier is preferably mixed with a water-insoluble liquid in order to obtain as even distribution of the emulsifier as possible in the mixture produced.

Suitable catalysts are amphiphatic catalysts, since they can be added at the final stage of the process when the process and production can be more easily controlled. Amphiphatic catalysts have a hydrophilic as well as an oleophilic quality, that is, they dissolve in water and also in a water-insoluble liquid. Such catalysts include hydrochloric acid, titanium tetrachloride, silicon tetrachloride, boron trihalide, boron trihalide complexes, p-toluenesulfonyl chloride, benzenesulfonyl chloride, o-nitrobenzenesulfonyl chloride, sulfur dioxide, phosphor trioxide, chlorotetraoxide, butylic acid phosphate, 2-chlorobenzoic acid and 4-biphenylcarboxylic acid. Also the catalyst is preferably mixed with the water-insoluble liquid employed.

The water-insoluble liquid phase is either an aliphatic or an aromatic low-viscosity hydrocarbon compound or a derivative of said compound, such as chlorinated hydrocarbon. Suitable agents include toluene, xylene, perchlorethylene and trichloroethylene.

The microcapsules produced are mechanically separated e.g. by filtering or centrifuging.

After the separation, the capsules may additionally be dried externally, i.e. substances remaining on the shell, such as water-insoluble liquid from the emulsifying, may be evaporated.

The separation is followed by neutralizing wherein the exterior surfaces of the microcapsules are made inert.

Applications a) Lightweight coated web offset paper (LWC-WO)

The use of microcapsules in LWC web offset coating slips will impart to the coating layer a potential mainly relating to the glaze of the paper. In this embodiment, a normal offset slip is used whereinto a certain amount of microcapsules prepared in accordance with Example 1 is added; the composition of the slip may be for example the following:

|  | parts by weight |
| --- | --- |
| kaolin | 0–100 |
| calcium carbonate (or gypsum or talc) | 0–100 |
| microcapsules (Example 1) | 5–20 |
| starch | 0–12 |
| latex | 0–12 |
| hardener (glyoxal) | 0.5–1 |
| lubricant | 0.5–1 |
| thickener | 0–2 |

The composition of a particularly preferred coating slip is the following:

| kaolin | 80 |
| --- | --- |
| calcium carbonate | 20 |
| microcapsules | 10 |
| starch | 5 |
| latex | 7 |
| hardener (glyoxal) | 0.6 |
| lubricant | 0.6 |
| thickener | 1 |

The coating of the paper is performed by using the roll application method. A suitable amount of coating is of the order of 11 to 14 g/m².

When paper of this kind is calendered, either normal supercalendering or gradient calendering is employed.

b) Light-lightweight coated rotogravure paper (mainly LLWC), the use of microcapsules affords advantages at least for the following properties of the paper: the hiding power, printability and optical properties improve, the glaze and rigidity increase.

A suitable coating slip in this respect is for instance a rotogravure slip whereinto microcapsules have been added according to the desired properties; the composition of the slip may be for instance the following:

|  | parts by weight |
| --- | --- |
| talc | 0–100 |
| calcium carbonate (or gypsum or kaolin) | 0–100 |
| microcapsules (Example 1) | 5–20 |

-continued

| | parts by weight |
|---|---|
| latex | 4-7 |
| lubricant | 0-1 |

The composition of a particularly preferred coating slip is the following:

| talc | 70 |
|---|---|
| kaolin | 30 |
| microcapsules | 10 |
| latex | 6 |
| lubricant | 0.6 |

The most advantageous method of coating in this case is the short dwell time application method. The amount of coating applied is 4 to 10 g/m². The best method of calendering is supercalendering or gradient calendering.

c) Machine-finished coated paper (MFC)

When on-line processes (coating and calendering) are employed for the production of coated paper, the use of microcapsules will also come into question. The microcapsules have a beneficial effect mainly on the bulk and optical properties of the paper.

The composition of the coating slip used is the following:

| | parts by weight |
|---|---|
| kaolin | 0-100 |
| calcium carbonate (or gypsum or talc) | 0-100 |
| microcapsules (Example 1) | 5-20 |
| starch | 0-12 |
| latex | 0-12 |
| hardener (glyoxal) | 0-1 |
| lubricant | 0-1 |
| thickener | 0-2 |

A particularly preferred coating slip composition is the following:

| kaolin | 70 |
|---|---|
| gypsum | 30 |
| microcapsules | 12 |
| starch | 3 |
| latex | 9 |
| hardener (glyoxal) | 0.5 |
| lubricant | 0.5 |
| thickener | 0.2 |

The short dwell time application method wherein the amount of coating is within the range 5 to 10 g/m² is the most suitable coating method.

The calendering is effected using either normal mat calendering or gradient calendering.

Results obtained

The use of microcapsules in the applications set forth, wherein only one pigment for each coating slip was used, was studied on a laboratory scale, and the most significant results are the following:

a) LWC-WO

By using a 90/10 kaolin/microcapsule ratio, an increase of 5 per cent in glaze was obtained in comparison with a coating slip which comprised 100 parts of kaolin. 7 parts of starch and 5 parts of SB latex served as binders. Further, the slip contained 0.5 parts of glyoxal and 0.5 parts of calcium stearate.

The coating was carried out by the roll application method. The amount of coating applied was 13 g/m². The calendering was performed by the normal laboratory supercalendering method. The rate was 300 m/min., the linear pressure 250 kN/m and the temperature 75° C.

b) LLWC-RG

In this case, a 90/10 talc/microcapsule ratio was used, which was compared with a 100 parts talc slip. An SB latex swellable in alkali served as the binder. 0.5 parts of calcium stearate was added. It proved that the use of microcapsules gave the following advantages:

the visual appearance was excellent (hiding power)
the Heliotest level increased by 5 to 10 mm
the opacity increased by 1 to 2 per cent
the glaze increased by 3 per cent
the rigidity increased considerably (20% more rigid paper)

The coating was performed by short dwell time application. The amount of coating applied was 7 g/m². The calendering was effected by supercalendering. The speed was 300 m/min., the linear pressure 240 kN/m and the temperature 75° C.

c) MFC

As in the first example, a kaolin/microcapsule ratio of 90/10 was used. 100 parts of kaolin served as a reference. The other additives were maintained constant, that is, 8 parts of starch, 4 parts of SB latex, 0.5 parts of glyoxal and 0.5 parts of calcium stearate.

In the final paper quality, particularly the following factors were accentuated: the bulk increased by 10%, the printability was excellent, the opacity increased by 3%.

The coating was effected by short dwell time application. The amount of coating applied was 7 g/m². The calendering was performed by mat calendering. The speed was 750 m/min., the linear pressure was 80 kN/m, the temperature was 80° C.

d) Properties of coating slip

The rheological properties of all coating slips were within the allowable bounds (low-shear and high-shear viscosity, water retention, stability). Also the dry solids content of the slips was sufficiently high, which is naturally of great importance in the drying of a wet coating layer in which connection an effort is made to minimize the drying costs.

EXAMPLE 1

Preparation of alginate microcapsules

A mixture was prepared which contained 100 g of urea, 250 g of an aqueous formaldehyde solution (dry solids content 40%; the solution also contained 6% of methanol) and 50 g of an aqueous alginate solution (dry solids content 1.0%). The pH was regulated to 9 by adding a 10% sodium hydroxide solution. The mixture was heated to a temperature of 75° C. at which it was maintained for one hour. Thereafter the solution containing the produced modified prepolymer was cooled to room temperature (25° C.).

10 g of an emulsifier (ethoxylated $\beta$-sitosterol) was dissolved in xylene (250 ml). The prepolymer solution was added to said xylene solution and stirred. The emulsification was complete in 1½ hours, when the diameter of the microcapsules produced was 0.1 to 10 $\mu$m. The shell thickness was 0.01 to 0.5 $\mu$m. Thereafter 32 ml of a xylene solution containing 5% of sulphur dioxide was added, whereafter the "walls" of the capsules started hardening (the polymerization started). To separate the microcapsules produced, 600 g of water was added and the pH was raised to 10 with a 10% sodium hydroxide solution, whereafter the xylene was removed by evaporation, and the microcapsules were separated, washed with water, and recentrifuged. The separated microcapsules were dispersed in water (ratio 1:1); the microcapsule dispersion obtained was used in the following applications.

This recipe has been used for the preparation of microcapsules when employed in the above-stated LWC-WO and LLWC-RG applications.

EXAMPLE 2

Preparation of alginate microcapsules

For the MFC application, microcapsules were prepared in the same way as in Example 1, but only half of the alginate amount was used, that is, 25 g of alginate solution. Then the shell of the capsules becomes weaker (diameter 0.2 to 2 $\mu$m, shell thickness 0.02 to 0.05 $\mu$m), and the capsules are readily ruptured in the nips of a mat calender which have relatively low linear pressures.

I claim:

1. A process for wetting a paper web during calendering comprising coating the surface layer of a paper web with water-containing microcapsules; and calendering said water-containing microcapsule coated paper web whereby said paper web is water wetted during calendering.

2. A process in accordance with claim 1 wherein said water-containing microcapsules are coated onto said paper web as part of a coating slip and wherein said microcapsules are ruptured during said calendering step whereby water is released.

3. A process in accordance with claim 2 wherein said water-containing microcapsules are present in said coating slip in a concentration of between 5% and 100% by weight, based on the initial weight of said coating slip.

4. A process in accordance with claim 3 wherein said water-containing microcapsules are present in said coating slip in a concentration of about 10% by weight, based on the initial weight of said coating slip.

* * * * *